United States Patent [19]
Rourke

[11] Patent Number: 5,945,261
[45] Date of Patent: Aug. 31, 1999

[54] CREATION OF BRAGG REFLECTIVE GRATINGS IN WAVEGUIDES

[75] Inventor: Howard Neil Rourke, Bishop's Stortford, United Kingdom

[73] Assignee: Northern Telecom Limited, Quebec, Canada

[21] Appl. No.: 08/856,959

[22] Filed: May 15, 1997

Related U.S. Application Data

[63] Continuation-in-part of application No. 08/752,699, Nov. 19, 1996.

[51] Int. Cl.$^6$ ........................................................ B02B 6/00
[52] U.S. Cl. .............................. 430/321; 430/22; 430/30; 430/290; 385/37
[58] Field of Search ...................... 430/1, 2, 321, 430/290, 30, 22; 359/34, 573, 575; 385/37

[56] References Cited

U.S. PATENT DOCUMENTS

| | | | |
|---|---|---|---|
| 4,807,950 | 2/1989 | Glenn et al. | 385/37 |
| 5,157,747 | 10/1992 | Aktins et al. | 385/37 |
| 5,367,588 | 11/1994 | Hill et al. | 359/573 |

FOREIGN PATENT DOCUMENTS

| | | |
|---|---|---|
| 19605062C1 | 6/1997 | Germany . |
| 8-286066 | 11/1996 | Japan . |

OTHER PUBLICATIONS

Kashyap, R., et al., "Novel Method of Producing All Fibre Photoinduced Chirped Gratings," Electronics Letters, vol. 30, No. 12, Jun. 9, 1994, pp. 996–998.

Albert, J., et al., "Minimization of Phase Error in Long Fiber Bragg Grating Phase Masks Made Using Electron Beam Lithography," IEEE Photonics Technology Letters, vol. 8, No. 10, Oct. 1996, pp. 1334–1336.

Stubbe, R., et al., "Novel Technique for Writing Long Superstructured Fiber Bragg Gratings," Photosensitivity and Quadratic Nonlinearity in a Glass Waveguides Fundamentals and Applications, vol. 22, Sep. 9, 1995, pp. 285–287.

Paper by R Kashyap et al 'Super–step–chirped fibre Bragg gratings', Electronics Letters (Jul. 18, 1986) vol. 32, No. 15 pp. 1394–1396.

Paper by S L Gilbert 'Comparison of UV–induced fluorescence and Bragg grating growth in optical fiber', CWK5, CLEO '94, p. 244.

Paper by T Komukai et al 'Fabrication of High Quality Long–Giber Bragg Grating by Monitoring 3.1 eV radiation (400nm) from GeO Defects', IEEE photonics Technology Letters vol. 8 No. 11, Nov. 1996, pp.145–147.

*Primary Examiner*—Martin Angebranndt
*Attorney, Agent, or Firm*—John D. Crane

[57] ABSTRACT

A method of avoiding unwanted phase discontinuities between adjacent sections of a long Bragg grating written section-by-section in an optical fibre uses masks with alignment parts additional to their writing parts. Each alignment part is a replica of a portion of the writing part of the adjacent mask. Light of the same wavelength as used for writing grating sections excites stronger luminescence in regions of waveguide where there has been no irradiation induced raising of the refractive index than in regions where such index raising has occurred. Therefore, for such light directed through the alignment part of the mask and into the already-written previous section of the grating, the intensity of luminescent light propagating to an end of the waveguide varies according to how well or how badly the bright fringes produced by the mask register with the corresponding irradiated portions of the written Bragg grating. Fine adjustment of mask position is made to obtain the intensity corresponding to the desired level of registry before writing with this mask is commenced.

18 Claims, 4 Drawing Sheets

CREATION OF BRAGG REFLECTIVE GRATINGS IN WAVEGUIDES

This application is a continuation-in-part of co-pending application Ser. No. 08/752,699 filed Nov. 19, 1996.

BACKGROUND TO THE INVENTION

This invention relates to the creation of Bragg reflective gratings in optical waveguides, typically optical fibre waveguides, by irradiation with ultra-violet light, through a mask, typically a phase mask, or alternatively by holographic means. One particular application for such reflective gratings is for chromatic dispersion equalisation in optical transmission systems. Such a use is described in the specification of U.S. Pat. No. 4,953,939.

Some applications for Bragg reflective gratings require a grating length which is longer than it is convenient to make a single mask for creating such a grating. There may, for instance, be a requirement to make a Bragg grating in the region of a metre long, whereas there are considerable difficulties in making an electron-beam fabricated mask much longer than about one hundred millimetres. A solution that has been proposed for overcoming this problem is to create the long grating step-wise in a succession of sections arranged end-to-end. Each section, except for the first to be created section, is created to commence at, or just beyond, the end of the next previously created section. If the long grating is designed for use in a wavelength division multiplexed (WDM) environment in which each section has a spectral bandwidth covering the whole spectrum of a single channel of the WDM signal, then it may be possible to arrange matters such that the reflection bands of the individual sections of the grating are spectrally separated by guard bands lying entirely within the spectral guard bands that separate the individual channels of the WDM signal. Under these circumstances any physical separation between adjacent sections of the grating is largely immaterial.

On the other hand, if breaks in the spectral reflection characteristic of the long grating are to be avoided, there is the problem that the spectral characteristic of one section will be cutting on at a point in the spectrum where the spectral characteristic of another section is cutting off. This means that both sections will be partially reflecting at a common wavelength. If the effective points of reflection are coincident, there is no problem. On the other hand, if one is longitudinally displaced from the other, then the two reflection components will coherently interfere, with the result that the magnitude of the resultant reflection is critically dependent upon the phase separation existing between the interfering components. A paper by R Kashyap et al entitled, 'Super-step-chirped fibre Bragg gratings', Electronics Letters (18 Jul. 1986) Vol. 32, No 15, pp 1394–6 explains that by deliberately arranging for adjacent sections of the grating not to abut, but to be separated by short intervening portions of waveguide, it is possible to make use of the photorefractive effect, and use UV light to trim the effective optical path length of any intervening portion to bring the phase separation of the two interfering components to a desired value. By this means it is possible to smooth out dips in the spectral reflection characteristic of the overall Bragg grating that can result from non-optimised intervals between adjacent sections of the grating. A drawback to this approach to lining up the sections is that it specifically requires a spacing between adjacent sections, and hence the delay time, the time taken by light of any particular wavelength to propagate from one end of the waveguide containing the Bragg grating to its point of reflection and back to the same end, is not a smoothly varying function of wavelength, but a function that contains as many steps, or more complicated discontinuities, as there are spaces between adjacent sections of grating, the delay in these discontinuous regions being affected by Fabry Perot type resonance effects between components of the same wavelength being reflected by the two adjacent grating sections.

SUMMARY OF THE INVENTION

The present invention is directed to a method of lining up the sections of an optical waveguide Bragg reflective grating as it is created section-by-section, the method having the particular property that it does not require there to be any spacing between adjacent sections that allows their direct abutment.

The method of the invention relies upon the fact that while a Bragg grating is being written in an optical waveguide by UV-irradiation the writing process causes the waveguide to luminesce. This luminescence is for instance described by S L Gilbert in a paper entitled, 'Comparison of UV-induced fluorescence and Bragg grating growth in optical fiber', CWK5, CLEO '94, page 244. This paper explains that as the writing proceeds, so the intensity of luminescence is reduced. In other words, the luminescence weakens as the refractive index of the UV-irradiated parts of the waveguide is raised by that irradiation. Some of this luminescence is emitted in directions such that it is guided by the waveguide, and this may be detectable at an end of the waveguide. This is for instance described by T Komukai et al in a paper entitled, 'Fabrication of High Quality Long-Fiber Bragg Grating by Monitoring 3.1-eV Radiation (400 nm) from GeO Defects', IEEE Photonics Technology Letters, Vol. 8, No. 11, Nov 1996, pp 145–7. The authors of this paper describe monitoring the intensity of the guided luminescence while the UV-irradiation is scanned along the axis of the fibre in order to produce a signal that shows up any tracking misalignment that causes the scanning to walk off the axis of the fibre. Walk-off of this sort is undesirable because it reduces the modulation depth of the written grating, and also changes its effective pitch. The signal is employed to keep the scanning on track, thereby providing a better quality product.

The method of the present invention also involves monitoring the intensity of guided luminescence, but not during the writing of any portion of a Bragg grating, nor is it in order to monitor or preclude off-axis movement. It is instead used for monitoring axial movement while no portion of the Bragg grating is being written, only being employed between the writing of different sections of a grating written section by section. Specifically, the method is concerned with ensuring that, when a section is written in adjoining relationship with a previously written section, the fringe pattern employed to write it is axially to provide a specific value of phase discontinuity, typically zero, between this section and the adjoining section.

For the writing of each section after the first, a phase mask, or other means for generating a fringe pattern having a writing portion and an alignment portion is used. The alignment portion is used for alignment purposes only, and is not excited when the writing portion is being used for writing. It is preferable similarly not to excite the writing portion while alignment is being carried out. The alignment portion is an extension of the writing portion, and has a periodicity that effectively matches a part of the writing portion of the fringe pattern employed in the writing of the adjoining section. The alignment process involves projecting alignment portion of the fringe pattern of the section about to be written into the adjacent end portion of the already created adjacent grating section. This light of the fringe pattern should be at a wavelength that causes luminescence in the waveguide, and in particular that causes luminescence that is stronger in regions where there has been no irradiation-induced raising of the refractive index than in regions where such index raising has occurred. Typically, but not necessarily, such a wavelength is the same wavelength as that employed to create the already created grating section.

When using a phase mask to generate the writing and alignment portions of the fringe pattern, the mask for creating each section after the first section has a main portion for creating the writing portion of the associated fringe pattern, and an overlap portion for creating the alignment portion of the associated fringe pattern. This overlap portion is used only for mask alignment purposes, and is not irradiated when the mask is actually being used to create its corresponding section of the Bragg grating. The alignment process involves projecting light through the overlap portion of the mask and into the adjacent end portion of the already created adjacent grating section. Movement of the mask relative to the waveguide in the direction of axial extent of the waveguide causes the bright portions of the fringe pattern to move in and out of exact registry with the raised index portions of the already written section of grating. The luminescence produced by the fringe pattern is least when the bright regions register with the most highly raised index portions of the written grating, and is greatest when the bright regions register with the portions of the written grating whose refractive index has either not been raised, or has been raised the least. Accordingly the relative movement produces an amplitude modulation of the intensity of luminescent light emitted from an end of the waveguide. This light is detected to provide a signal employed to enable the axial movement to be halted at a point giving the desired registry condition between the alignment fringe pattern and the grating elements of the written Bragg grating section. Typically the desired registry condition is that in which the bright fringes register exactly with the most highly raised index portions of the written grating, the condition of minimum luminescence intensity, because this is the condition in which there is no phase discontinuity between the grating elements of the written section and those of the adjoining section about to be written. However, in some circumstances a different registry condition will be required because a non-zero phase discontinuity of a specific value is wanted at this point.

The method of the present invention has some features in common with that described in the specification of patent application Ser. No. 08/752699. Whereas in the method of the present invention reliance is placed upon luminescence to obtain registry of successive sections in the writing of a Bragg grating; in the method of patent application Ser. No. 08/752699 reliance is instead placed upon the fact that the irradiation that is employed to create a fringe pattern of refractive index (real part) changes in the waveguide that co-operate to form the Bragg reflective grating, does not change exclusively the real part of the refractive index, but changes also the imaginary part, i.e. produces a concomitant optical absorption fringe pattern. To use this effect for registration purposes, a similarly aligned fringe pattern of light generated by the mask of the grating section next to be written is superimposed upon a portion of the already written absorption grating. This fringe pattern of light is arranged to have the same periodicity as the absorption grating so that relative movement by half a grating period is sufficient to change from the situation in which the bright bands of the fringe pattern of light register with the dark (relatively less highly transmissive) bands of the absorption fringe pattern to the situation in which the bright bands of the fringe pattern of light register with the light (relatively more highly transmissive) bands of the absorption fringe pattern, i.e. to change from a condition of maximum transmission to one of minimum transmission. A photodetector is placed to receive this transmitted light, and the output of this photodetector is monitored while the relative positioning of mask and grating is adjusted to provided the required transmission state corresponding to the required positional relationship. A particular advantage of the luminescence method of the present invention over that of patent application Ser. No. 08/752699 is concerned with sensitivity, improved sensitivity being obtained with the luminescence method by virtue at least in part by the light-guidance provided by the waveguide in which the Bragg grating is being created.

BRIEF DESCRIPTION OF THE DRAWINGS

There follows a description of the creating step-by-step in sections of a Bragg reflection grating in an optical fibre waveguide, the method embodying the invention in a preferred form. The description refers to the accompanying drawings, in which.

DETAILED DESCRIPTION OF A PREFERRED EMBODIMENT

Figure 1:
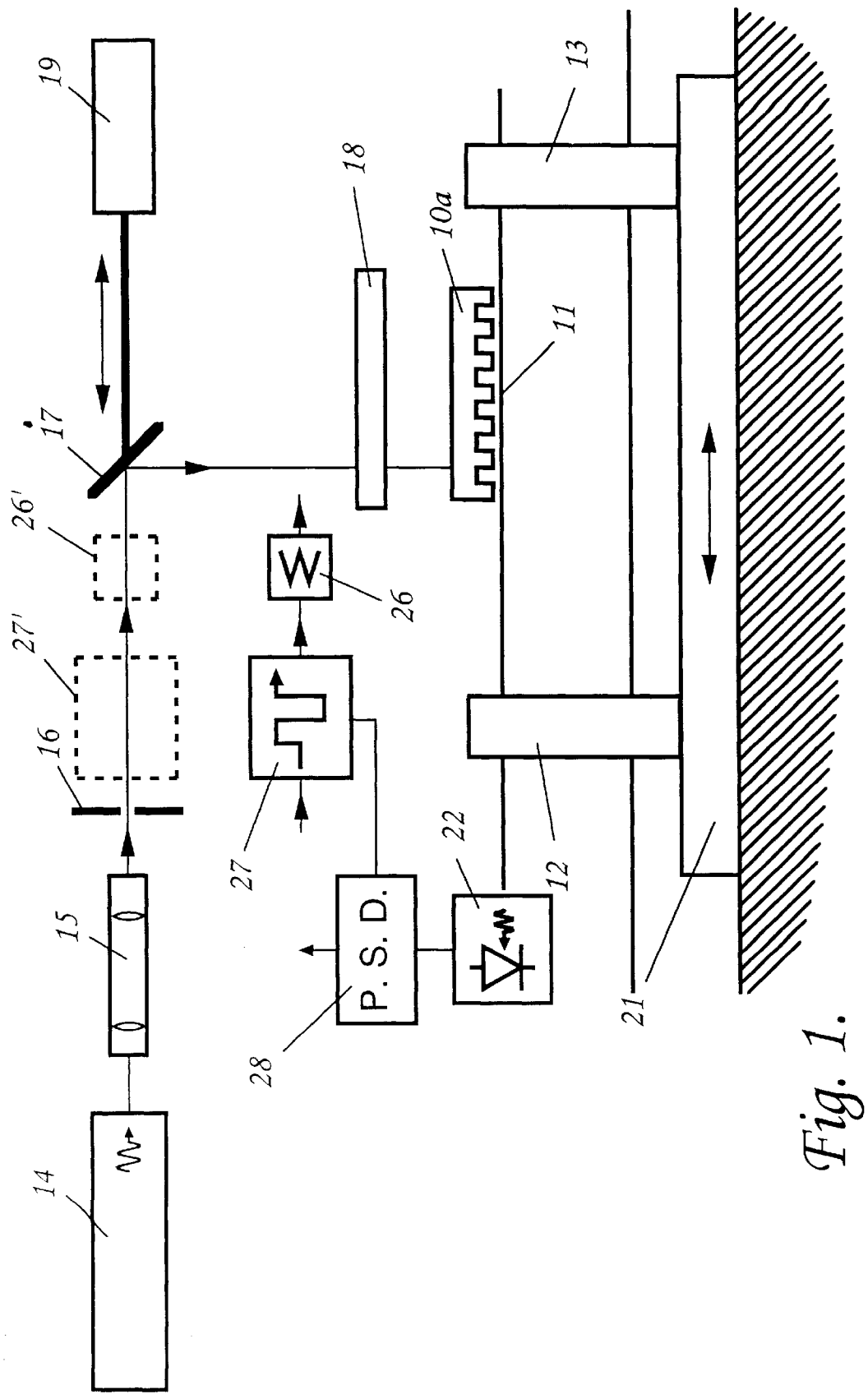
FIG. 1 is a schematic diagram of the apparatus employed to create the Bragg reflective grating.

Referring to FIG. 1, a portion of a length 11 of single mode optical fibre in which the grating is to be created, is lightly tensioned between two supports 12 and 13 so as to be almost in contact with a phase grating 10a, which is oriented so that its grating lines extend transversely of the fibre axis, preferably at right angles to that axis. An argon ion laser 14 providing a frequency doubled ultraviolet light output at 244 nm has this output directed on to the phase grating 10a via a telescope 15, an aperture 16, a mirror 17 and a cylindrical lens 18. The mirror 15 is attached to a stepper drive 19 by means of which the mirror can be translated in a controlled manner in the axial direction of the fibre 11 so as to track the light beam across the phase grating 10a in the axial direction of the fibre 11.

The phase mask 10a is a phase contrast diffraction grating created in a thin sheet of silica. For this purpose the silica sheet was coated with a layer of chromium that was itself patterned by electron beam lithography to form a mask for reactive ion etching of the underlying silica. The depth of the etch was chosen to suppress the zero order diffraction of light normally incident upon the phase mask. The laser has a cw output of approximately 100 mW at 244 nm, of which approximately half is concentrated by the optical system at the phase mask in a substantially rectangular zone measuring approximately 6mm by 200 μm with its long axis aligned with the fibre axis. This power was found sufficient to write, with a single traverse at 200 μm per second of the beam of light in the axial direction of unhydrogenated fibre whose core was doped with boron and germania in a manner similar to that described by D L Williams et al in the paper entitled, 'Enhanced UV Photosensitivity in Boron Co-doped Germanosilicate Fibres', Electronics Letters 7th Jan. 1993 Vol. 29, No. 1, pages 45–47.

The above details typify but one of several different alternative methods by which the first section of the Bragg grating could have been created in the fibre 11, and thus far the method of the invention has not been distinguished over the prior art.

Figure 2:
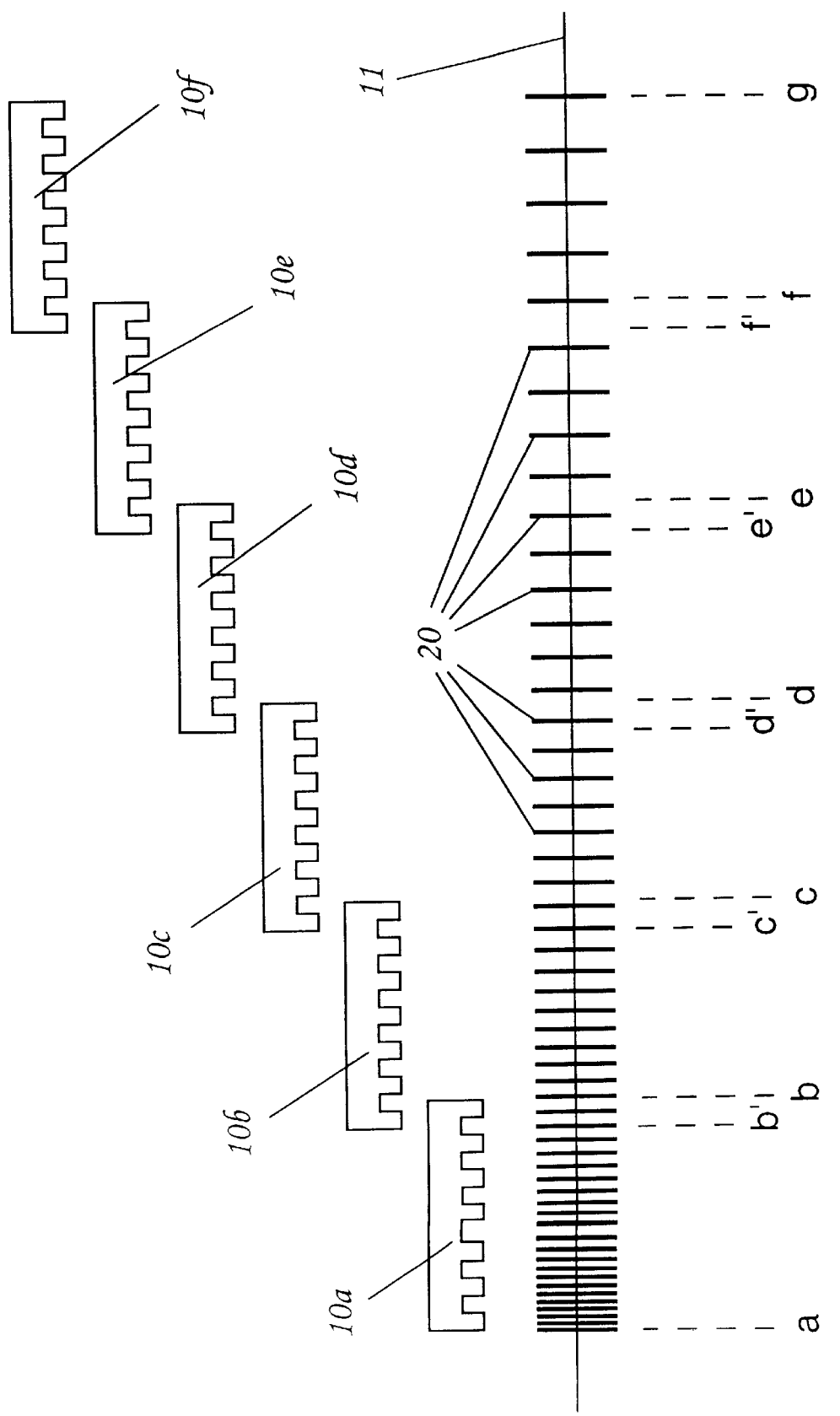
FIG. 2 is a schematic diagram of the grating.

In the particular case of a long Bragg reflective grating created in a length of single mode fibre 11 for use as in dispersion compensation, the pitch of the grating is not uniform, but is monotonically chirped from one end to the other as schematically represented by the lines 20 in the diagram of FIG. 2. For the creating of such a grating section-by-section, a different one of a set of masks is used for the creation of each section, and the masks need to be employed in such a way that the grating is created without phase discontinuity at the boundary between any of its adjacent sections. For illustrative purposes only, this set has been represented in FIG. 2 as the set of six masks 10a to 10f. (In practice several tens of masks may be used to create a single long Bragg reflective grating.) In the case of these six masks, mask 10a is employed to create the lines 20 in the range from a to b for creating those in the range b to c, and so on. Mask 10a covers the range from a to b, but each of the other masks 10b to 10f covers a range that also extends over a portion of the preceding range. Thus mask 10b covers the range b to c, the range that it writes into the fibre, but also the portion b' to b of the range a to b written using mask 10a. It is this portion b' to b, and the corresponding portions c' to c, d' to d, e' to e and f' to f that, according to the method of this invention, are used for alignment purposes. In a specific instance of using a set of masks to create a Bragg reflection grating step by step, the grating writing distances b to c, c to d, etc. were each about 60 mm long, and the overlap distances b' to b, c' to c, etc. were about 5 mm long.

Ideally the chirping of the grating would have been both monotonic and smooth, but with the particular E-beam apparatus employed to make the set of phase masks, this was not a practical proposition. Accordingly, an approximation to a smoothly chirped grating was provided using phase masks which, instead of being smoothly graded in pitch, were step-graded, typically with between two- and three-hundred steps. Within each step the pitch is constant, but there is a smooth progression of pitch from step to step within phase mask from one end to the other. The precision of the E-beam was sufficient to preclude indexing problems between the component steps of any individual phase mask.

For convenience of illustration, FIG. 2 shows the masks 10a to 10f arranged in echelon but, when each is actually being used for creating its associated section of Bragg grating, it is in the same close-spaced relationship with the fibre 11 as described earlier with particular reference to FIG. 1 concerning the positional relationship between mask 10a and fibre 11.

Conveniently, each mask 10b to 10f is placed, in its turn, in the position formerly occupied by mask 10a, and the fibre 11 is indexed along in its axial direction by approximately the required amount to obtain the requisite alignment between this mask and the Bragg grating already created in the fibre 11. Relying solely upon dead-reckoning, such indexing can achieve an accuracy of typically about 1 to 2 μm, but a greater precision is required. This is achieved by following the dead-reckoning indexing by a fine adjustment of relative position. This fine adjustment is achieved using a high precision translation stage 21 (FIG. 1), for instance a piezo-electric or electrostrictive translation stage, to which either the mask is mounted, or the fibre supports 12 and 13. For ease of illustration, FIG. 1 depicts the fibre supports 12 and 13 as being mounted on the translation stage.

Figure 3:
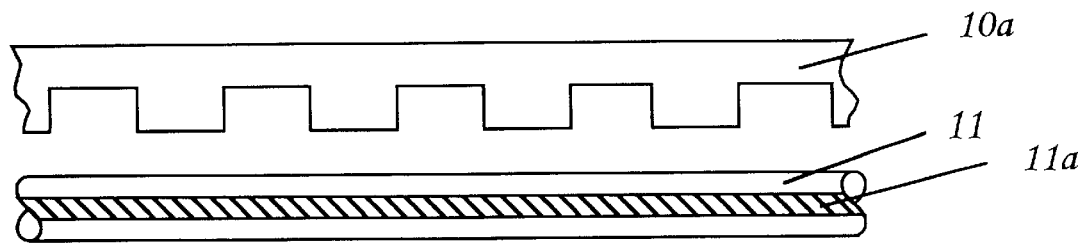
FIGS. 3 to 5 are scrap views of a portion of the fibre during successive stages of the creation of a section of the Bragg reflective grating within it.
Figure 4:
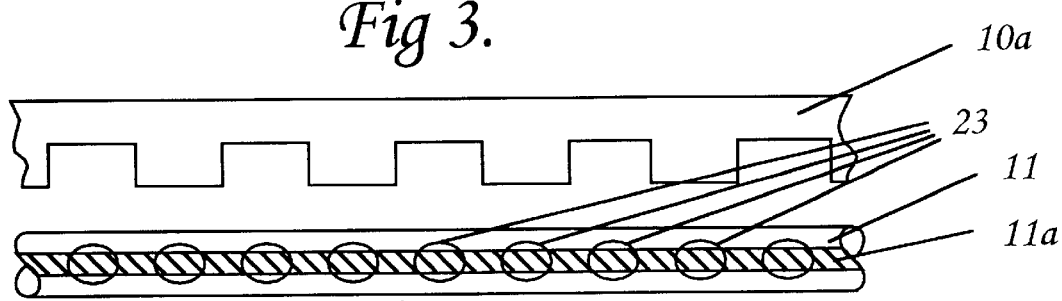
Figure 5:
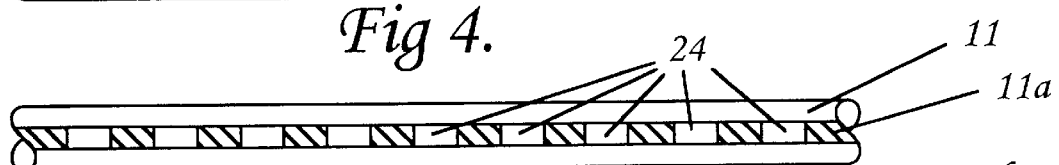
Figure 6:
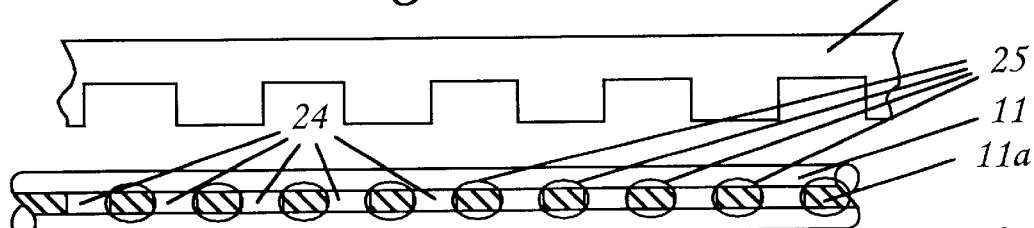
FIGS. 6 to 8 illustrate the alignment procedure employed to align a mask employed for creating the next adjacent section of the Bragg reflective grating.

The way the fine adjustment is achieved will now be described with particular reference to FIGS. 3 to 8, which specifically relate to the fine adjustment of the position of mask 10b in relation to fibre 11. These FIGS. 4 to 8 depict a portion of the fibre 11 lying between b' and b of FIG. 2. FIG. 3 shows a portion of the fibre 11, with its doped core 11a, and also a portion of the mask 10a in position preparatory for creating a section of Bragg reflective grating in the fibre 11. FIG. 4 depicts the actual creation of that section of grating. This is achieved by directing the intense ultraviolet light from laser 14 through the mask 10a to form a fringe pattern of intense spots 23 of light which, by the photorefractive effect produce corresponding volumes of increased refractive index (and reduced absorption) in the core 11a. These volumes are depicted at 24 in FIG. 5, which depicts the fibre 11 after removal of mask 10a. FIG. 6 depicts the situation once mask 10b has been indexed into approximately correct position relative the fibre, and while a portion of the region of mask 10b lying between b' and b is illuminated with interrogation illumination to produce a fringe pattern of spots 25 of light. This region of the mask 10b is an exact replica of the region of mask 10a lying between b' and b.

Accordingly, within the region lying between b' and b, the relative disposition of the enhanced index, reduced absorption volumes 24, which exactly matches the relative disposition of the fringe pattern of intense spots 23 produced by mask 10a, is itself exactly matched by the relative disposition of the fringe pattern of intense spots 25 produced by mask 10b. In general there is liable to be some arbitrary displacement between the volumes 24 and spots 25, and FIG. 6 specifically illustrates an instance where this displacement amounts to half a fringe period.

The interrogation illumination to produce the fringe pattern of spots 25 must be of a wavelength and intensity that does not produce any significant photorefractive effect changes of its own upon the fibre 11, but on the other hand must be at a wavelength that causes luminescence in the waveguide, and more particularly one that causes luminescence that is stronger in regions where there has been no irradiation-induced raising of the refractive index than in regions where such index raising has occurred. For the particular fibre composition and illumination conditions quoted above it has been found that these criteria are adequately met by using the same wavelength (244 nm), but reducing the intensity at the mask by approximately 20 dB.

Figure 7:
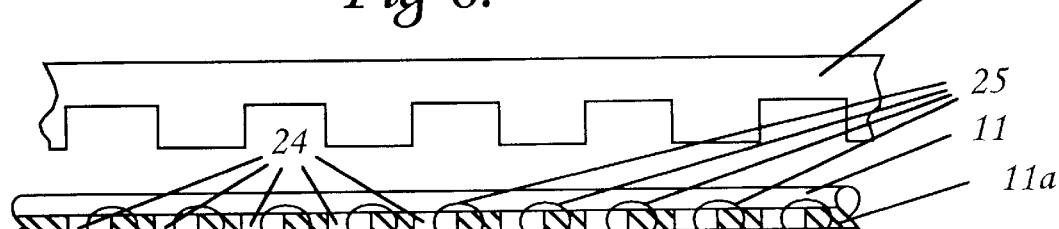

If the dead-reckoning indexing that brings the mask 10b into approximately the required position relative the fibre 11, but misses the exact position by approximately half a fringe period, then the interrogation spots 25 will be lined up, as depicted in FIG. 6, with the relatively lower (less enhanced) refractive index regions lying between adjacent relatively higher (more enhanced) refractive index regions 24. If it missed by approximately a quarter of a fringe period, the situation would be as depicted in FIG. 7, with the interrogation spots 25 only half registering with the relatively higher refractive index regions 24. If it fortuitously provided the exactly required alignment, then the interrogation spots 25 would be fully registered with the relatively higher refractive index 24, as depicted in FIG. 8.

Figure 8:
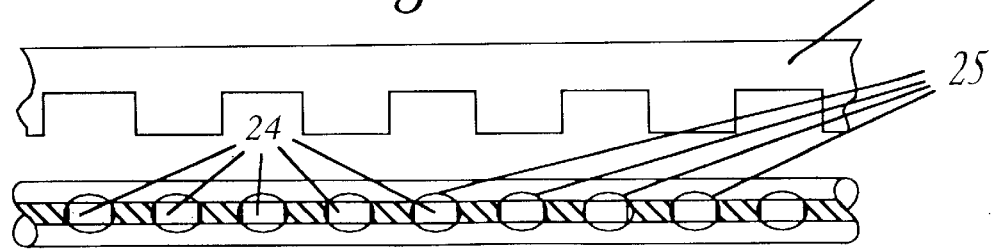

Having regard to the fact that the interrogation bright spots 25 produce higher intensity luminescence in the relatively lower (less enhanced) refractive index regions than in the relatively higher (more enhanced) refractive index regions, it is clear that the situation of FIG. 8, the positioning relationship particularly required to preclude phase discontinuities at the boundaries between adjacent sections, is the situation that provides minimum luminescence because it is the situation in which the interrogation bright spots all register with regions of more enhanced refractive index which, because of this enhancement, are regions of least luminescence. Similar reasoning reveals that the situation of FIG. 6 is the situation that provides maximum luminescence. The piezo-electric translation stage 21 is therefore operated to cycle the relative positioning of mask 10b and fibre 11, while at the same time monitoring the output of a photodetector 22 (FIG. 1) positioned to detect that portion of the luminescence which guided by the fibre 11 to an end thereof.

Figure 9:
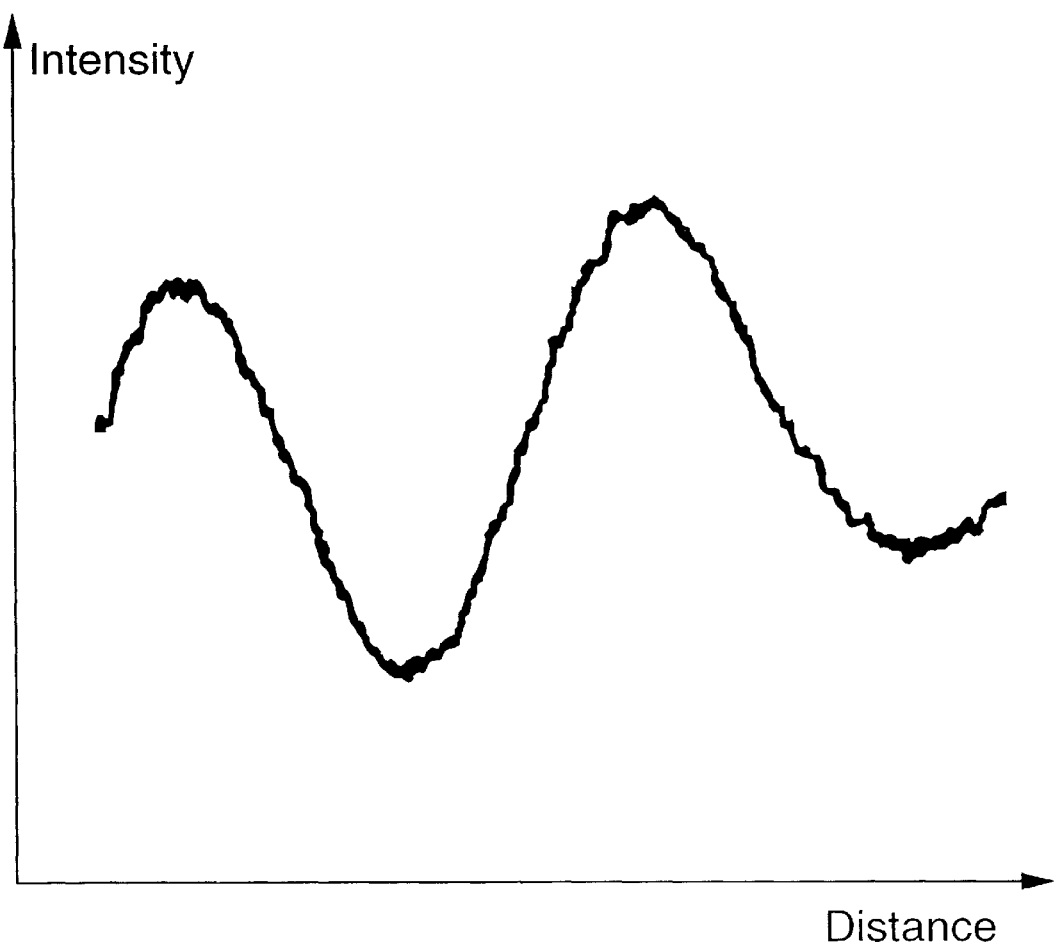
FIG. 9 is a chart-recorder trace obtained in performance of the alignment procedure of FIGS. 6 to 8.

To perform this interrogation and monitoring, the combination of an attenuator 26 (FIG. 1), providing approximately 20 dB attenuation, and an optical chopper 27 is introduced into the path of the light from the laser, for instance at positions indicated by broken lines 26' and 27'. The output of the photodetector 22 is then taken to a phase sensitive detector 28 provided with a phase reference signal from the chopper 27. FIG. 9 depicts a chart-recorder trace showing how, for a representative interrogation, the amplitude of the output of the phase sensitive detector varied as a function of the drive applied to the piezo-electric element of the high precision translation stage 21. In the particular instance of requiring no phase discontinuity between adjacent sections, the drive is therefore adjusted to a minimum of the chart-recorder trace of FIG. 9 and, while this position is maintained, the second section of the grating, the section from b to c is created in fibre 11.

The procedure for aligning and writing with the third and subsequent masks (masks 10c and successors) follows the same procedures outlined above in respect of aligning and writing with the second mask (mask 10b).

I claim:

1. A method for creating a Bragg reflective grating in an optical waveguide comprising the steps of:
    a.) exposing, through a mask, the optical waveguide to grating writing radiation to form a first grating section in the optical waveguide; followed by
    b.) translating the mask longitudinally relative to the optical waveguide; followed by
    c.) exposing, through a first portion of the mask, a portion of the grating already formed to interrogation illumination that is of a wavelength that excites luminescence in parts of the waveguide not previously exposed to said grating writing radiation, and adjusting the longitudinal translation of the mask relative to the optical waveguide until luminescence monitored at one end of the optical waveguide is minimized; followed by
    d.) exposing, through a second portion of the mask, the optical waveguide to further grating writing radiation to form a second grating section in the optical waveguide adjacent the first grating section.

2. The method for creating a Bragg reflective grating of claim 1, wherein said optical waveguide comprises an optical fiber waveguide.

3. The method for creating a Bragg reflective grating of claim 1, wherein said mask is an optical phase grating mask.

4. The method for creating a Bragg reflective grating of claim 1, wherein said grating writing radiation used for the formation of said first and second grating sections is radiation having the same wavelength as said interrogation illumination, but having a greater intensity than that of the interrogation illumination.

5. The method for creating a Bragg reflective grating of claim 1, wherein said grating writing radiation used for the formation of said first and second grating sections is radiation having a wavelength different from that of said interrogation illumination.

6. The method for creating a Bragg reflective grating of claim 1, additionally including repeating steps b.), c.) and d.) for each additional section of the Bragg reflective grating that is created.

7. A method for creating a Bragg reflective grating in an optical waveguide comprising the steps of:
    a.) exposing, through a first mask, the optical waveguide to grating writing radiation to form a first grating section in the optical waveguide; followed by
    b.) exposing, through a second mask, a portion of the grating already formed to interrogation illumination, which second mask has a writing portion and an alignment portion, which alignment portion is a replica of a portion of the first mask, wherein the interrogation illumination is of a wavelength that excites luminescence in parts of the waveguide not previously exposed to said grating writing radiation, wherein the exposure of the grating already formed to the interrogation illumination is exposure through the alignment portion of the second mask, and translating the second mask longitudinally relative to the optical waveguide until luminescence monitored at one end of the optical waveguide is minimized; followed by
    c.) exposing, through the writing portion of the second mask, the optical waveguide to further grating writing radiation to form a second grating section in the optical waveguide adjacent the first grating section.

8. The method for creating a Bragg reflective grating of claim 7, wherein said optical waveguide comprises an optical fiber waveguide.

9. The method for creating a Bragg reflective grating of claim 7, wherein each said mask is an optical phase grating mask.

10. The method for creating a Bragg reflective grating of claim 7, wherein said grating writing radiation used for the formation of said first and second grating sections is radiation having the same wavelength as said interrogation illumination, but having a greater intensity than that of the interrogation illumination.

11. The method for creating a Bragg reflective grating of claim 7, wherein said grating writing radiation used for the formation of said first and second grating sections is radiation having a wavelength different from that of said interrogation illumination.

12. The method for creating a Bragg reflective grating of claim 7, additionally including repeating steps b.) and c.) for each additional section of the Bragg reflective grating that is created.

13. A method for creating a Bragg reflective grating in an optical waveguide comprising the sequential steps of:
    a.) exposing, through a first mask positioned at a first location relative to the optical waveguide, the optical waveguide to grating writing radiation to form a first grating section in the optical waveguide;

b.) displacing the first mask;

c.) positioning a second mask, having a writing part and an alignment part, wherein the alignment part of the second mask is a replica of a portion of the first mask, in a second location relative to the optical waveguide such that the alignment part is approximately coincident, relative the optical waveguide, with the corresponding part of the first mask during the formation of the first grating section by performance of step a.);

d.) exposing, through the alignment part of the second mask, a portion of the grating already formed to interrogation illumination that is of a wavelength that excites luminescence in parts of the waveguide not previously exposed to said irradiation, and adjusting the location of the second mask longitudinally relative to the optical waveguide until luminescence monitored at one end of the optical waveguide is optimized;

e.) exposing, through the writing part of the second mask, the optical waveguide to further grating writing radiation to form a second grating section in the optical waveguide adjacent the first grating section.

14. The method for creating a Bragg reflective grating of claim 13, wherein said optical waveguide comprises an optical fiber waveguide.

15. The method for creating a Bragg reflective grating of claim 13, wherein each said mask is an optical phase grating mask.

16. The method for creating a Bragg reflective grating of claim 13, wherein said grating writing radiation used for the formation of said first and second grating sections is radiation having the same wavelength as said interrogation illumination, but having a greater intensity than that of the interrogation illumination.

17. The method for creating a Bragg reflective grating of claim 13, wherein said grating writing radiation used for the formation of said first and second grating sections is radiation having a wavelength different from that of said interrogation illumination.

18. The method for creating a Bragg reflective grating of claim 13, additionally including repeating steps b.), c.), d.) and e.) for each additional section of the Bragg reflective grating that is created.

* * * * *